2,964,578
PRODUCTION OF STYRENE

Lawrence J. Hughes, Hitchcock, and Talmage D. McMinn, Jr., Texas City, Tex., assignors to Monsanto Chemical Company, St. Louis, Mo., a corporation of Delaware No Drawing. Filed July 11, 1958, Ser. No. 747,824

6 Claims. (Cl. 260—669)

This invention relates to a novel method for the production of styrene.

Styrene is a monomer which has found extensive use in the manufacture of resins and plastics as well as in the production of synthetic rubber. Currently, it is in great commercial demand. This important monomer may be obtained by means of any of several chemical processes. The methods in more common use all involve two or more reaction stages. In the initial reaction stage, benzene is alkylated with ethylene or with ethyl alcohol in the presence of a Friedel-Crafts type catalyst to produce ethylbenzene. The second reaction stage involves a dehydrogenation of ethylbenzene either thermally or catalytically. Alternatively, in the second stage, styrene may be obtained by chlorinating ethylbenzene and subjecting the chlorinated product to a dehydrochlorination treatment. Although multistage processes give satisfactory yields of styrene, a single-step process has very obvious advantages from the standpoint of savings in capital cost of equipment and in ease and economy of plant operation.

It is thus an object of the present invention to provide a new one-step process for the production of styrene. Further objects and advantages of the invention will become obvious from the following description and the appended claims.

According to the invention, styrene is produced by the reaction of benzene and dichloroethane in the vapor phase at elevated temperatures in contact with a catalyst comprising as the active catalytic agent an oxide of aluminum, silicon, chromium, or iron or mixtures of these oxides. Styrene may be separated from the reaction mixture by distillation or other suitable separation procedures.

The catalysts which are preferred for use include activated alumina, both refined or in its crude or natural state as bauxite, silica gel, silica gel impregnated with cobalt chloride, iron oxide, silica-alumina mixtures, chromia-silica-alumina mixtures, and the like.

Either of the isomers of dichloroethane, i.e., 1,1-dichloroethane or 1,2-dichloroethane, may be used in the process of the invention. The temperature at which the reaction is effected may vary from about 300° C. to about 600° C., depending upon the particular catalyst employed. Optimum temperatures vary for different catalysts, lower temperatures being employed with the more active catalysts and vice versa. For example, the preferred temperature with silica gel is around 300° C. whereas with an iron oxide catalyst it is around 500° C. Generally, temperatures from 300° C. to 500° C. are preferred.

While the reaction is generally conducted at atmospheric pressure, subatmospheric pressure may be employed if desired and some advantages may be gained from the use of superatmospheric pressures in commercial operation.

The operation of the present process is relatively simple and comprises merely the passing of mixtures of benzene and dichloroethane over beds of the specified catalyst in granular, pelletized, or other particulate form. Contact time of the reactants with the catalyst will vary with temperature and catalyst activity. Usually, contact times in the range from about 1 to about 5 seconds will give satisfactory results. The shorter contact times will be required with more active catalysts and/or higher temperatures. Equimolecular proportions of the reactants may be employed but it is preferable to have the benzene in excess. Benzene-to-dichloroethane ratios from 1:1 to 15:1 are suitable with ratios from 3:1 to 4:1 being preferred. The process is usually operated by passage of the reactants over the catalyst until its activity begins to diminish noticeably due to the gradual deposition of carbonaceous materials on its active surfaces. To insure continuity of operation, the catalyst beds may be employed in parallel connection so that as the activity of one unit decreases below a practical level, the stream of reactants may be diverted to a fresh catalyst bed. Spent catalytic material may be reactivated by burning off the carbonaceous deposits with oxidizing gas mixtures such as combustion gases containing controlled amounts of oxygen and finally air or by treatment with superheated steam.

The following example is presented to illustrate the invention but is not intended to limit the scope of the invention in any manner except as it is limited in the appended claims.

Example

A series of runs were conducted in which the following catalysts were used respectively: activated alumina, 3–8 mesh; an activated bauxite in which the major impurities are silica and iron oxide having a particle size in the range from 4 through 10 mesh; silica gel in a particle size from 3–8 mesh; silica gel, 3–8 mesh, impregnated with from about 2 to about 4% cobalt chloride; a mixture of 85–90% iron oxide, 5% chromium oxide and 5–10% potassium oxide in the form of ¼ in. x 3/16 in. pellets; and a mixture of approximately 12% alumina, 1% chromium oxide, and 87% silica in the form of spheres ranging from 6–10 mesh in size. Benzene and 1,2-dichloroethane in a molecular ratio of 4:1 were fed to a vaporizer. The gas mixture from the vaporizer was preheated and introduced into a catalyst tube ¾ in. in diameter having a section about 17 in. long packed with the catalyst and heated to a temperature within the range from about 300° C. to about 500° C. After passing through the catalyst bed maintained at essentially atmospheric pressure at a rate such as to give a contact time of from about 2 to about 4 seconds, the effluent gases were passed through water-cooled condensers and the condensate was collected in receiving flasks. A solution of 0.1% tert-butylcatechol in benzene was introduced into the condensers to inhibit polymerization in this part of the system. Uncondensed gas was passed through a drying tube then bubbled into an HCl scrubber filled with a 0.5 N solution of sodium hydroxide and finally led into a vented Dry-Ice trap.

The condensate collected in each run was fractionally distilled and a styrene-containing fraction was recovered in each instance. The styrene content of these fractions was determined by means of infrared spectra.

What is claimed is:

1. A process for the manufacture of styrene which comprises subjecting a mixture of benzene and dichloroethane at a temperature of from about 300° C. to about 600° C. to contact with a catalyst wherein the active catalytic agent is chosen from the group consisting of the oxides of aluminum, silicon, chromium, and iron and mixtures thereof.

2. A process for the manufacture of styrene which comprises subjecting a mixture of benzene and dichloroethane in a molecular ratio in the range from 1:1 to 15:1 at a temperature of from about 300° C. to about 500° C. to contact with a catalyst where in the active catalytic agent is chosen from the group consisting of the oxides of aluminum, silicon, chromium, and iron and mixtures thereof.

3. A process for the manufacture of styrene which comprises subjecting a mixture of benzene and dichloroethane in a molecular ratio of 4:1 at a temperature from about 300° C. to about 500° C. to contact with a catalyst wherein the active catalytic agent is activated alumina.

4. A process for the manufacture of styrene which comprises subjecting a mixture of benzene and dichloroethane in a molecular ratio of 4:1 at a temperature from about 300° C. to about 500° C. to contact with a catalyst wherein the active catalytic agent is silica gel.

5. A process for the manufacture of styrene which comprises subjecting a mixture of benzene and dichloroethane in a molecular ratio of 4:1 at a temperature from about 300° C. to about 500° C. to contact with catalyst wherein the active catalytic agent is iron oxide.

6. A process for the manufacture of styrene which comprises subjecting a mixture of benzene and dichloroethane in a molecular ratio of 4:1 at a temperature from about 300° C. to about 500° C. to contact with catalyst wherein the active catalytic agent is a mixture of silica, chromia, and alumina.

References Cited in the file of this patent

UNITED STATES PATENTS

| | | |
|---|---|---|
| 2,184,235 | Groll et al. | Dec. 19, 1939 |
| 2,265,312 | Quattlebaum et al. | Dec. 9, 1941 |
| 2,389,444 | Mattox | Nov. 20, 1945 |
| 2,609,403 | Salt et al. | Sept. 2, 1952 |

FOREIGN PATENTS

| | | |
|---|---|---|
| 308,122 | Canada | Jan. 27, 1931 |